US006203072B1

(12) United States Patent
Berghuis et al.

(10) Patent No.: US 6,203,072 B1
(45) Date of Patent: Mar. 20, 2001

(54) CORRUGATING JOINT AND SYPHON SYSTEM

(75) Inventors: Raymond R. Berghuis, Almere (NL); Edmund Kozlowski, Hamburg (DE); Jennifer J. Baker, Kalamazoo, MI (US); Timothy N. L. Henry, Marcellus, MI (US); James A. Medsker, Lawton, MI (US)

(73) Assignee: The Johnson Corporation, Three Rivers, MI (US)

( * ) Notice: Subject to any disclaimer, the term of this patent is extended or adjusted under 35 U.S.C. 154(b) by 0 days.

(21) Appl. No.: 09/385,678

(22) Filed: Aug. 30, 1999

(51) Int. Cl.[7] .............................. F16L 39/04; F16L 35/00

(52) U.S. Cl. ......................... 285/24; 285/184; 285/121.3; 285/39; 285/330; 165/90; 34/125

(58) Field of Search ................................ 285/121.7, 184, 285/24, 272, 330, 121.3, 121.6, 39; 165/67, 90; 34/119, 124, 125

(56) References Cited

U.S. PATENT DOCUMENTS

| | | | |
|---|---|---|---|
| 2,542,287 | 2/1951 | Neubauer . | |
| 2,732,228 | 1/1956 | Armstrong . | |
| 3,265,411 | 8/1966 | Monroe et al. . | |
| 3,948,283 * | 4/1976 | Asfura et al. | 34/125 |
| 4,590,688 | 5/1986 | Steffero, Sr. . | |
| 5,533,569 | 7/1996 | Reibel et al. . | |
| 5,907,909 * | 6/1999 | Autio | 165/90 |

* cited by examiner

*Primary Examiner*—Dave W. Arola
(74) *Attorney, Agent, or Firm*—Young & Basile, P.C.

(57) ABSTRACT

A rotary joint for a heat transfer drum using a stationary syphon pipe system. The syphon pipe is supported on a syphon tube adjustably mounted upon the rotary joint body whereby the distance between the syphon pipe intake and the drum shelf can be very accurately adjusted and maintained. Also, the syphon pipe is mounted upon the syphon tube in a pivotal manner to permit ready installation of the syphon system and employs a locking threaded sleeve arrangement assuring accurate location of the syphon pipe relative to the syphon tube upon the syphon pipe pivoting to its operative position.

9 Claims, 4 Drawing Sheets

FIG-3
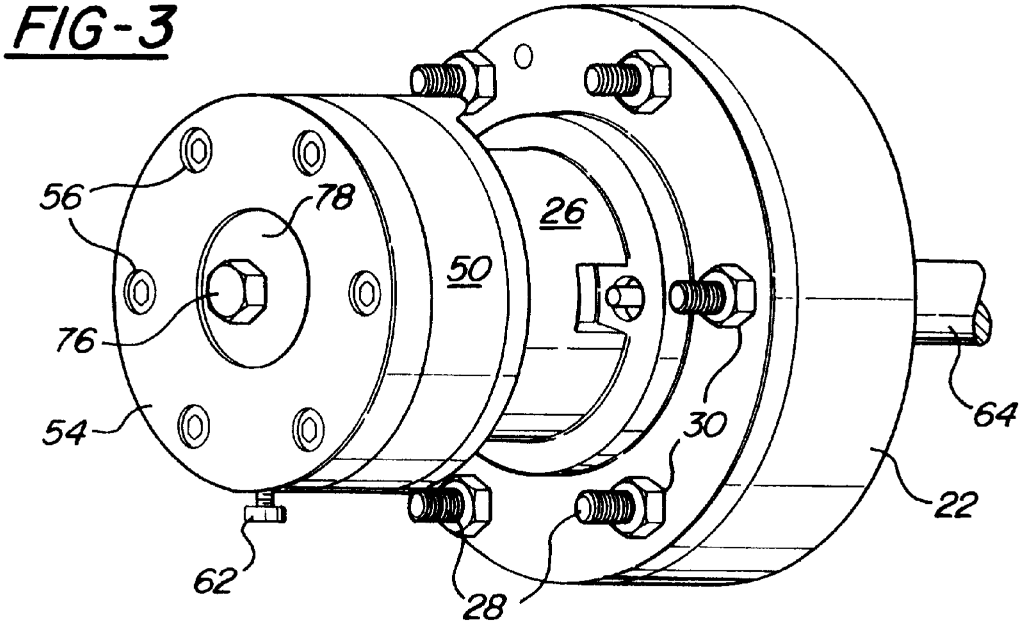
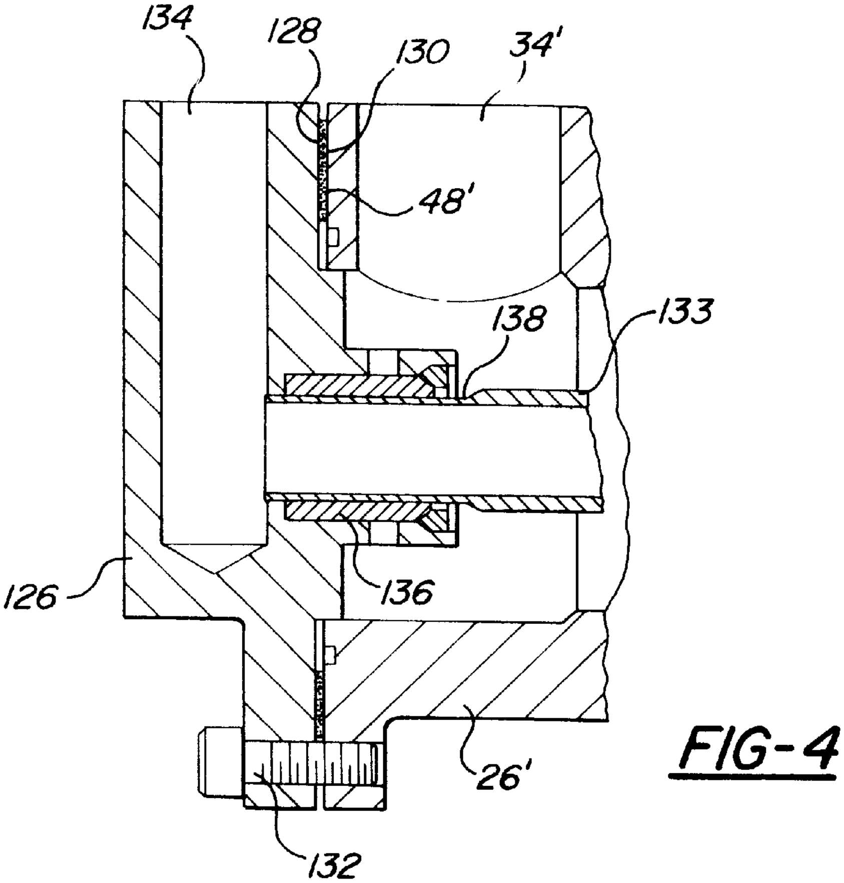
FIG-4

CORRUGATING JOINT AND SYPHON SYSTEM

BACKGROUND OF THE INVENTION

1. Field of the Invention

The invention pertains to rotary joints supplying steam to rotating heat transfer drums using stationary syphons for condensate removal.

2. Description of the Related Art

Rotating heat transfer drums such as of the type used in paper, corrugated paper and cardboard manufacture usually employ steam to heat the drum and a rotary joint located at the end of a hollow drum journal is used to introduce the steam into the drum interior. As the steam condenses within the drum, the condensate is removed through a rotary joint, usually the same joint which introduced the steam, and it is common for rotary joints to include both steam inlet ports and condensate exit ports.

Syphon systems for removing condensate from rotating heat transfer drums are either of the "rotating" type where the conduit pickup occurs at a shoe contacting the drum interior and wherein the syphon structure within the drum rotates with the drum, or the syphon system may be of the "stationary" type wherein the condensate pickup apparatus extends into the drum interior, but does not rotate with the drum, and includes a condensate pickup port disposed adjacent the drum shell interior.

Whether a heat transfer drum employs a rotating syphon system or a stationary syphon system depends on various factors including cost, size of the drum, rate of drum rotation, material to be heated and other factors. Both types are well known in the dryer drum art.

The installation of a rotating syphon system usually requires that considerable installation work occurs within the drum interior. This is not a problem with large size dryer drums which have access openings located in the drum ends. However, with smaller sizes of drums, it is usually necessary to employ a stationary syphon system whereby the syphon structure may be inserted through the hollow drum journal, and once inserted, the syphon pipe portion of the syphon system is moved to an operating location within the drum adjacent the drum shell inner surface for removing condensate therefrom. Samples of such stationary syphon systems are shown in U.S. Pat. Nos. 2,542,287; 2,732,228; 3,265,411; 4,590,688 and 5,533,569.

It has long been recognized that the puddle of condensate which accumulates in the lower region of the dryer drum creates problems. This condensate accumulation "tumbles" within the drum as it rotates requiring excessive power, and deleteriously affects the heat transfer from the steam within the drum to the drum shell. In rapidly rotating larger drums, this condensate forms a film throughout the drum periphery, and can be effectively removed by a rotating syphon system wherein the condensate film is removed and maintained of minimum thickness. With a stationary syphon system, condensate is only removed at the lower region of the drum, and the condensate accumulation in the lower region of the drum will exist unless the drum rate of rotation is high enough to cause the condensate to "film" about the drum periphery.

Because of the "insulation" effect that condensate accumulation has on heat transfer from the steam to the drum, it is particularly important when manufacturing corrugated fluted paper and cardboard to be able to accurately maintain the temperature of the drum very closely as to accurately control the humidity content of the paper being dried by the drum. Heretofore, stationary syphon systems often fail to maintain the desired distance between the syphon pipe intake and the drum shell interior surface as to minimize the condensate accumulation and provide optimum uniform heat transfer characteristics and control to the drum. Prior stationary syphon systems required that the spacing of the syphon pipe inlet from the drum interior surface be determined by regulating the length of the syphon pipe, and due to manufacturing tolerances in drum manufacture, and because of variations in rotary joint installations, it is very common that a greater spacing exists between the syphon pipe pickup entrance and the drum shell than is desired, resulting in an excessive accumulation of condensate and uneven heating of the drum shell.

OBJECTS OF THE INVENTION

It is an object of the invention to provide a rotary joint for a rotating heat transfer drum using a stationary syphon system wherein the syphon system can be very accurately adjusted relative to the drum periphery after installation of the rotary joint.

Another object of the invention is to provide a rotary joint for a rotating heat transfer drum having a stationary syphon system wherein accurate radial positioning of the syphon system relative to the axis of drum rotation is readily achieved exteriorly of the rotary joint.

Yet another object of the invention is to provide a rotary joint for a rotating heat transfer drum having a stationary syphon system including a horizontal syphon tube and a vertically disposed syphon pipe wherein the pipe is pivotally mounted upon the inner end of the tube, which is located within the drum, and the pipe is firmly mechanically oriented to the support tube when in the operative position, and locked in the operative position.

An additional object of the invention is to provide a rotary joint for a rotating heat transfer drum having a stationary syphon system wherein a substantially vertically oriented syphon pipe is pivotally mounted upon the inner end of a horizontal syphon tube and a threaded interconnection exists between the pipe and tube when the pipe is in the operative condensate removing position, and the threaded interconnection is achieved after the syphon system has been inserted into the drum interior.

SUMMARY OF THE INVENTION

A rotary joint in accord with the invention is mounted upon a stationary support located adjacent the drum journal. A steam inlet defined in the rotary joint introduces steam into the drum journal through a rotary seal arrangement.

A syphon tube support is mounted upon the outer end of the rotary joint body and serves as the support for a horizontally disposed syphon tube which extends through the rotary joint body and the hollow drum journal, and includes a syphon pipe mounted upon its innermost end within the drum.

The syphon tube support is mounted upon the rotary joint body in such a manner as to permit the syphon tube support to be vertically positioned relative to the rotary joint body which, in turn, vertically positions the syphon tube and syphon pipe associated therewith. This vertical adjustment of the syphon tube support is achieved through a threaded screw arrangement, and as the syphon tube is supported at axially spaced locations on the tube support, and is thereby cantilever mounted at its outer end, the vertical adjustment of the syphon tube support results in an equal vertical adjustment of the location of the syphon tube relative to the rotary joint body, and the axis of drum rotation. The syphon tube support includes a port in communication with the syphon tube whereby the condensate may be removed therefrom.

The syphon pipe is pivotally mounted upon the inner end of the syphon tube whereby the syphon pipe may be pivoted to an installation position locating the pipe relatively parallel to the length of the syphon tube. In such an orientation, the syphon pipe, and syphon tube, can be readily inserted through the hollow drum journal. Once the syphon pipe is within the interior of the drum, and is not supported by the drum journal, the syphon pipe will pivot downwardly under gravitational force. This syphon pipe movement will locate the condensate entrance or intake of the syphon pipe relatively close to the interior of the drum periphery or shell, but gravitational force will not usually fully pivot the syphon pipe to its operative position.

The inner end of the syphon tube includes a threaded sleeve adapted to be received within a threaded bore defined in the upper end of the syphon pipe once the syphon pipe is in its operative position. To this end, a torque transfer tool is inserted through the outer end of the syphon tube to engage torque transfer means defined on the threaded sleeve whereby the threaded sleeve may be readily rotated to cause the sleeve to thread into the bore defined on the upper end of the syphon pipe for locking the syphon pipe into its operative position in a fluid tight relationship to the syphon tube.

As mentioned above, usually the syphon pipe will not have pivoted under gravitational force to its full operative position. Accordingly, the torque tool inserted through the syphon tube, includes an alignment projection which will engage the threaded bore of the syphon pipe to pivot the syphon pipe threaded bore into alignment with the threaded sleeve which permits further rotation of the threaded sleeve to cause the sleeve to thread into the syphon pipe bore. A shoulder defined on the syphon tube inner end engages with a head defined on the threaded sleeve against which the sleeve may be tightened to tightly draw the syphon pipe into its operative position and accurately locate the syphon pipe inlet to the drum shell inner surface.

After the aforementioned assembly of the syphon pipe to the syphon tube has been completed, very accurate adjustment of the syphon pipe inlet to the drum shell is produced by adjusting the location of the syphon tube support on the rotary joint body, and in this manner, a more accurate location of the syphon pipe inlet to the drum shell can be achieved than was heretofore possible, minimizing the amount of condensate which can accumulate within the drum.

The positive locking of the syphon pipe to the syphon tube assures that the syphon pipe will be disposed in the vertical “6o’clock” position placing the syphon pipe inlet into the center of the accumulated condensate, insuring effective condensate removal.

To remove the syphon system from the drum, it is only necessary to reinsert the torque transfer tool through the syphon tube into the threaded sleeve, rotate the threaded sleeve in an unlocking direction to remove the sleeve from the syphon pipe threaded bore, and upon the completion of such operation, the syphon tube and pipe can readily be withdrawn through the drum journal as the syphon pipe will pivot to its installation position during such withdrawal.

BRIEF DESCRIPTION OF THE DRAWINGS

The aforementioned objects and advantages of the invention will be appreciated from the following description and accompanying drawings wherein:

FIG. 3 is an exterior perspective view of a rotary joint constructed in accord with the invention, FIG. 4 is an elevational diametrical sectional detail view of a modification of the syphon tube support when the rotary joint of the invention is used with a rotating syphon system.

DESCRIPTION OF THE PREFERRED EMBODIMENTS

Figure 1:
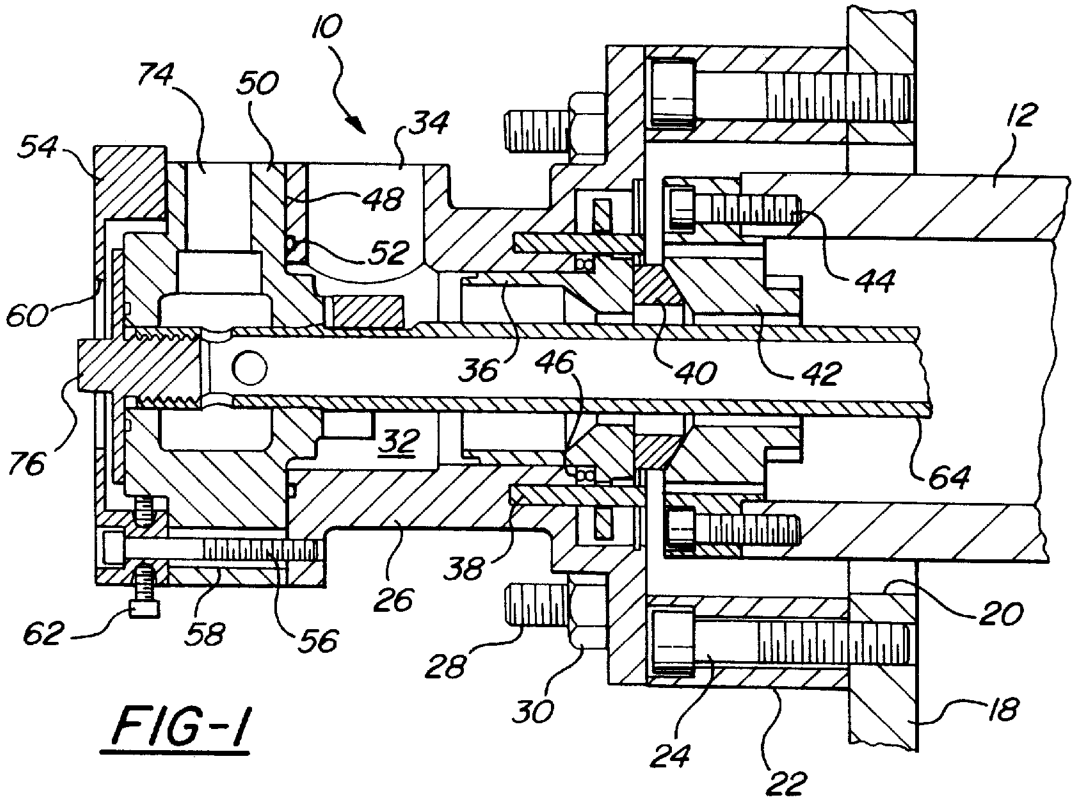
FIG. 1 is an elevational diametrical sectional view of a rotary joint and drum journal in accord with the invention.

A rotary joint in accord with the invention is shown in section in FIG. 1 wherein the rotary joint is generally indicated at 10. The purpose of the rotary joint 10 is to introduce, and remove, a heat transfer medium, such as steam, into a rotating dryer drum such as used in the manufacture of paper, corrugated paper and cardboard, and such a drum includes a cylindrical drum journal 12, FIG. 1, a radial drum end wall 14, and the periphery or shell of the drum is defined by a cylindrical shell 16 shown schematically in FIGS. 7 and 8. The paper or cardboard web to be dried, not shown, passes over the exterior of the shell 16 absorbing the heat of the drum.

A stationary support plate 18, FIG. 1, includes an opening 20 through which the drum journal 12 extends. The bearings supporting the journal are not illustrated, and the drum journal will be rotating within the support opening 20. A cylindrical bracket 22 is bolted upon the support 18 by bolts 24 concentric to the opening 20, as will be appreciated from FIG. 1.

The rotary joint body 26 is mounted upon the bracket 22 by threaded studs 28 affixed to the bracket 22 and these studs extend through holes in the body flange whereby tightening of the nuts 30 fixes the rotary joint body 26 upon the bracket 22 in a stationary manner. This relationship is apparent from FIG. 3.

Internally, the rotary joint body 26 includes a chamber 32 having an inlet port 34 into which steam is introduced through appropriate piping and conduit systems, not shown. The chamber 32 includes a reciprocal piston 36 guided upon piston pins 38, and the piston 36 includes a flat surface engaging the annular seal ring 40 which engages the conical seal surface of the wear plate 42. The wear plate 42 is mounted upon the end of the drum journal 12 by bolts 44 whereby the wear plate 42 will rotate with the drum journal. A spring 46 biases the piston 36 to the right, FIG. 1, insuring engagement of the piston, seal ring 40 and the wear plate 42 even though the body chamber 32 is not pressurized.

The rotary joint body 26 includes a flat outer face 48 against which the syphon tube support 50 is mounted. The syphon tube support 50 and the joint body 26 are sealed in a fluid tight relationship by the annular seal 52. An annular retaining ring 54, FIG. 3, is located around the outer end of the syphon tube support 50 and is mounted upon the rotary joint body 26 by six bolts 56 threaded into the rotary joint body. As will be appreciated from FIGS. 1 and 2, the bolts 56 extend through the oversized holes 58 defined in the syphon tube support. A central opening 60 is defined in the retaining ring 54, and a threaded cap screw 62 functions as adjustment means for radially positioning the syphon tube support 50 on the rotary joint body 26, as later described.

The steam condensate is removed from the drum by a syphon system which includes the horizontal syphon tube 64 which extends through the drum journal 12, the wear plate 42, the piston 36 and the rotary joint body chamber 32. The syphon tube 64 is keyed against rotation relative to the body 26 by key 66, FIGS. 1 and 2, and the syphon tube includes a conical enlargement or boss 68 spaced from its outer end. A plurality of openings 70 are defined in the syphon tube 64 between the boss 68 and the end of the syphon tube, and these openings 70 communicate with the chamber 72 of the syphon tube support. The chamber 72 is in communication with the port 74 defined in the syphon tube support through which the condensate is removed via a conventional hose and conduit system, not shown.

The outer end of the syphon tube 64 is sealed by a nut 76 threaded into internal threads defined in the syphon tube end, and the nut 76 includes a thin radially extending washer-type head 78 of a diameter larger than the opening 60 defined in the retaining ring 54. The syphon tube support 50 includes a conical bore 80 which receives the syphon tube conical boss 68 in a complementary manner, and the outer end of the syphon tube is received within cylindrical bore 82 defined in the syphon tube support 50. Accordingly, upon tightening of the nut 76, the conical boss 68 is tightly drawn into engagement with the conical bore 80, and the end of the syphon tube is closely received within cylindrical bore 82. In this manner, the syphon tube 64 is supported at its outer end in a cantilever manner by the syphon tube support 50.

The inner end of the syphon tube 64 is threaded and has an end fitting 84 threaded thereon. The end fitting 84 includes an internal chamber 86 which is coaxial with the bore of the syphon tube 64, and the chamber 86 includes a concentric annular shoulder 88. A tubular threaded sleeve 90 is rotatably mounted within the chamber 86 and is axially positionable therein. The sleeve threads 92 are defined on a stem which is slidably received within the fitting bore 94, and a head 96 defined on the sleeve 90 includes abutment surfaces adapted to engage the fitting shoulder 88, as later described. The sleeve head 96 is formed with a hexagonal bore 98 communicating with the sleeve bore, and this hexagonal bore constitutes torque transfer means for the sleeve as will be later appreciated.

The syphon pipe fitting 100 is pivotally mounted upon the syphon tube fitting 84 by pivot 102, and includes a chamber 104. The syphon pipe 106 is affixed within the fitting 100 in communication therewith, and a threaded bore 108 having an axis transversely disposed to the length of the syphon pipe 106 is defined in the fitting 100 in communication with chamber 104.

The lowermost end of the syphon pipe 106 mounts the syphon shoe 110 having the inlet opening 112 defined therein.

The syphon pipe fitting 100 includes a flat surface 114 which is ultimately engageable with a flat surface 116 defined on the end fitting 84, as described below.

Figure 6:
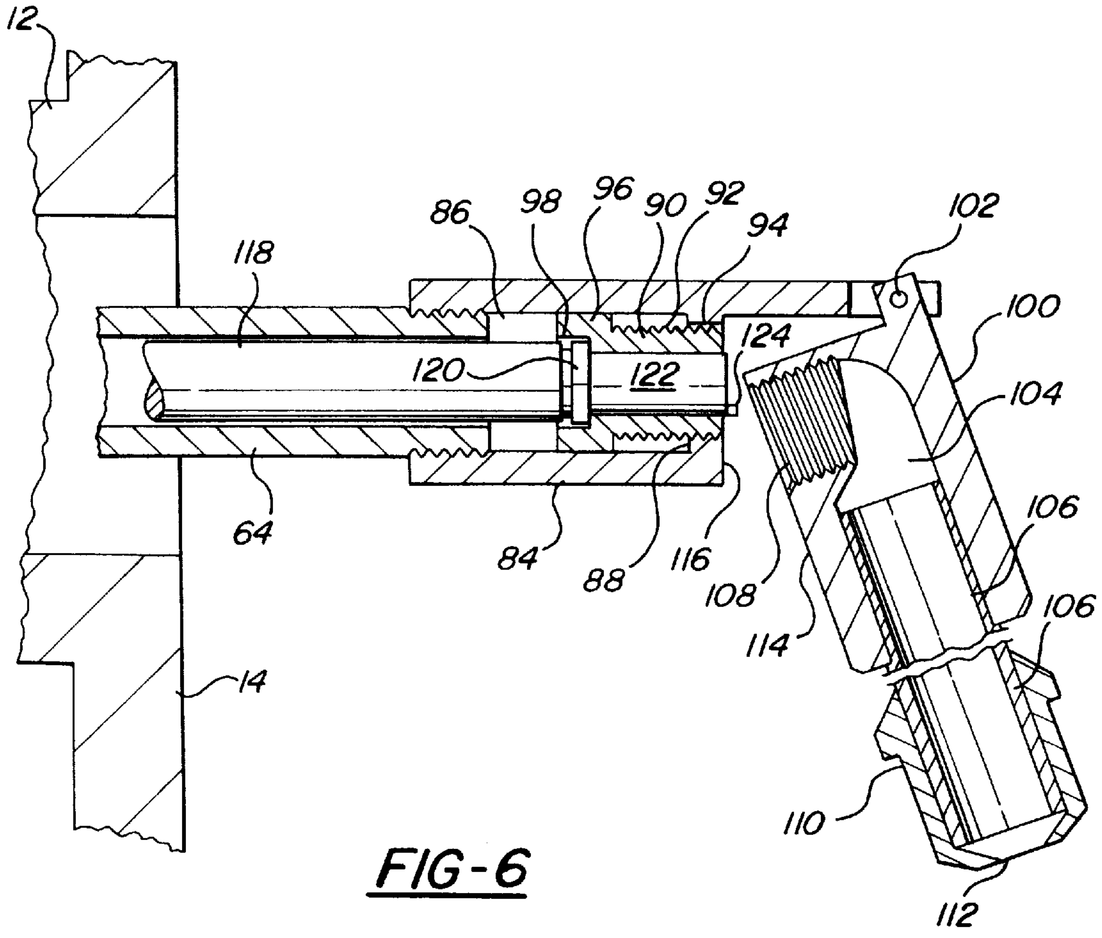
FIG. 6 is an elevational detail sectional view illustrating a partial pivoting of the syphon pipe toward the operative position, the torque transfer tool being shown in position within the threaded sleeve.
Figure 7:
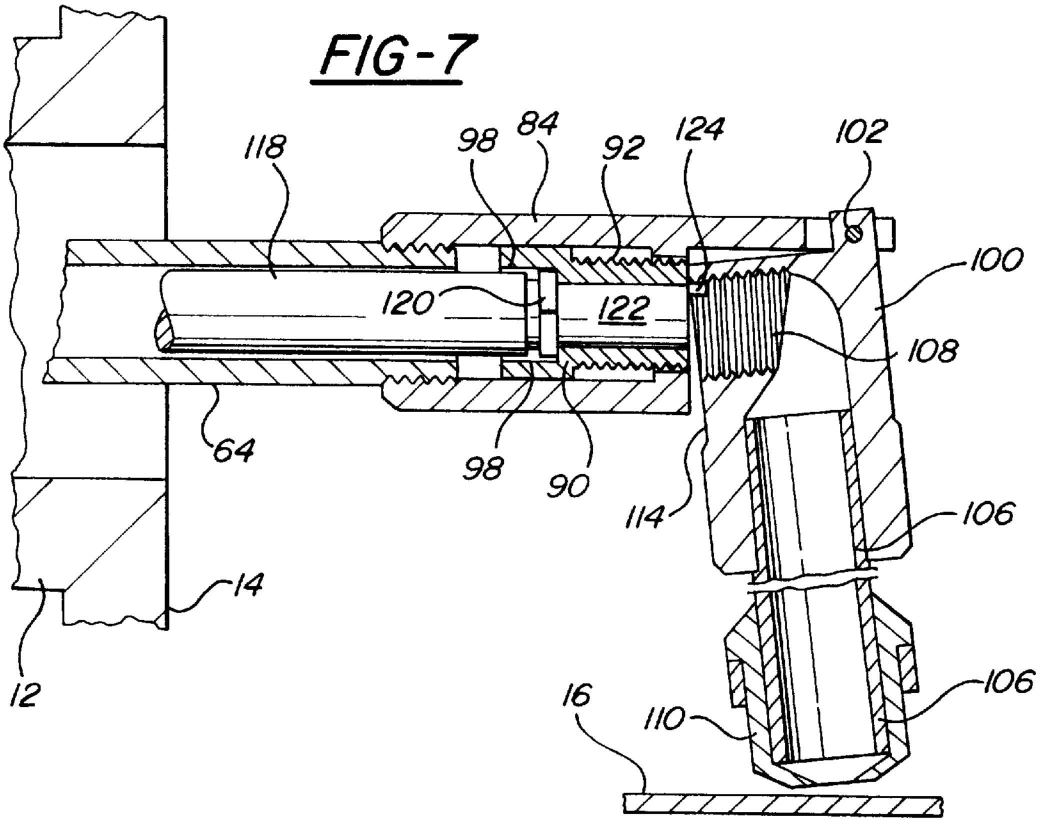
FIG. 7 is a view similar to FIG. 6 illustrating the alignment projection on the torque transfer tool engaging the syphon pipe threaded bore to align the threaded bore with the syphon tube sleeve.

The torque transfer tool for rotating the sleeve 90 is shown at 118 in FIGS. 6 and 7. This torque transfer tool comprises an elongated rod of greater length than the syphon tube 64, and the tool includes a hexagonal head 120 which is receivable within the sleeve head hexagonal bore 98. A cylindrical pilot end 122 is defined on the tool 118 for reception within the sleeve bore during sleeve tightening.

An axially extending alignment projection 124, FIGS. 6 and 7, extends from the tool pilot end, and its purpose is to aid in aligning the syphon pipe threaded bore 108 with the threads 92 of the sleeve 90 for properly positioning the syphon pipe 106 to its operative position.

The rotary joint and syphon structure described above is installed as follows:

Initially, the rotary joint body 26 is mounted upon the stationary support 18 in the apparent manner, and prior to the rotary joint body being mounted upon the bracket 22, the wear plate 42 will have been mounted upon the end of the drum journal 12. Thereupon, the rotary joint body 26 can be mounted upon the bracket 22 in the apparent manner. At this time, the syphon tube support 50 will not be mounted upon the body 26 by bolts 56.

At this time, the syphon tube 64 is mounted to the syphon tube support 50. The syphon tube is rotatively oriented to the syphon tube support by means of the key 66 received within a slot defined in the syphon tube, and received within a notch defined in the syphon tube support. In this manner, angular orientation of the syphon tube to the syphon tube support 50, on the vertical, is assured. The nut 76 is threaded into the internal threads in the end of the syphon tube 64, and tightened, which draws the syphon tube conical boss 68 into firm engagement with the conical bore 80 and the end of the tube 64 into bore 82, and the syphon tube 64 will be firmly connected to the syphon tube support 50 in a non-rotative manner.

Figure 5:
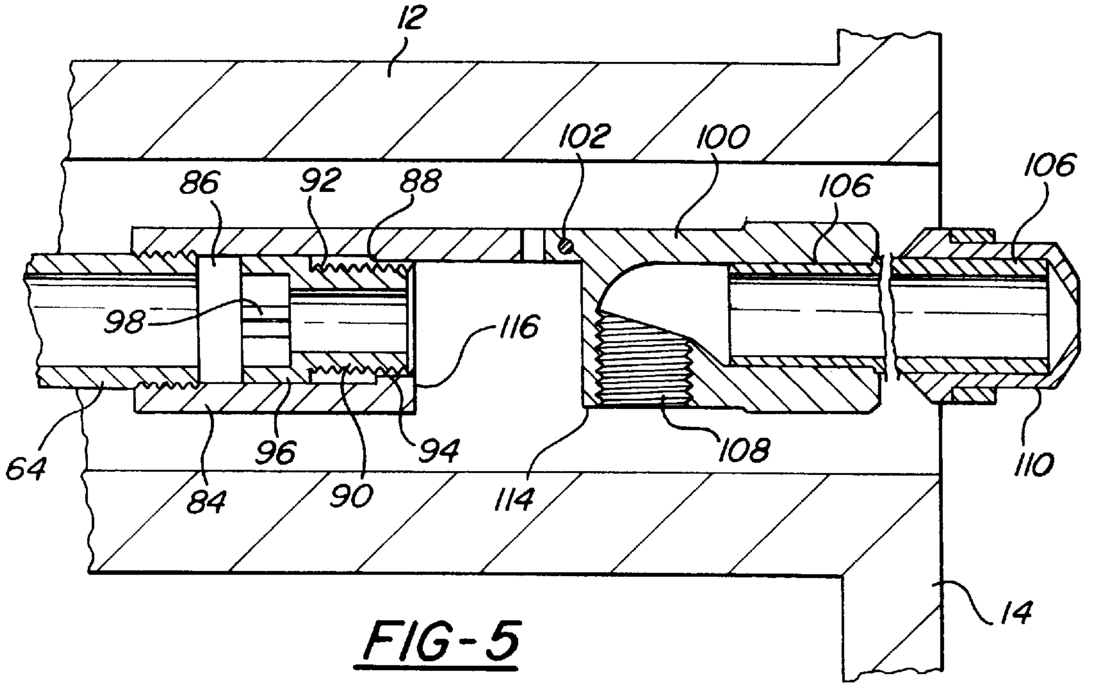
FIG. 5 is an elevational detail sectional view of the inner end of the syphon tube, and the syphon pipe, during installation or removal of the syphon system relative to the drum.

Thereupon, the syphon structure is inserted through the wear plate 42 and through the drum journal 12. To permit this installation, the syphon pipe fitting 100 must be oriented parallel to the length of the syphon tube 64 by pivoting the fitting 100 about pivot 102, as shown in FIG. 5. In FIG. 5, the syphon pipe 106 is shown in its installation position which permits the syphon tube 64 to be fully inserted into the rotary joint, drum journal and drum until the flat face on the syphon tube support engages the rotary joint body face 48, and these faces engage the seal 52. The bolts 56 may now be preliminarily tightened to affix the syphon tube support 50 to the body 26.

Figure 8:
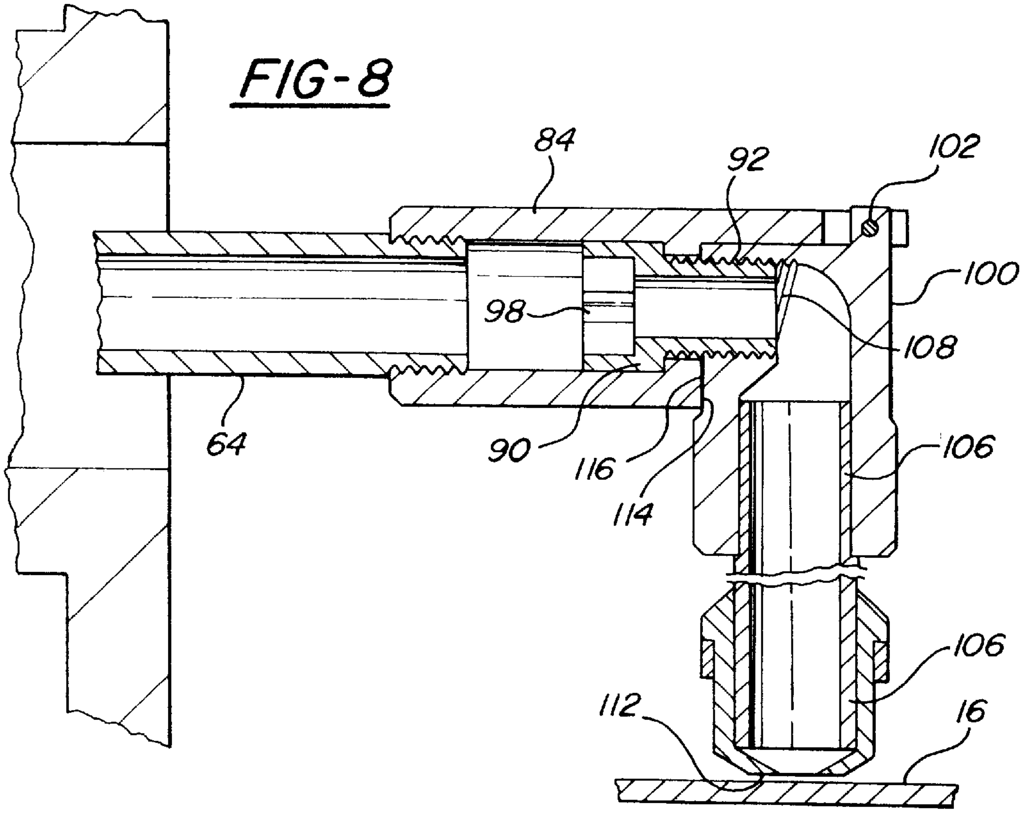
FIG. 8 is a sectional view similar to FIGS. 6 and 7 illustrating the syphon pipe in the full operative position, and the torque transfer tool has been removed from the syphon tube.

Once the syphon pipe fitting 100 has been inserted into the drum interior past the drum journal 12, gravitational forces will cause the syphon pipe fitting 100 and syphon pipe 106 to pivot in a clockwise direction, FIGS. 6 and 7. The position of the syphon pipe structure at this time will be approximately that shown in FIGS. 6 and 7. At this time, the nut 76 is removed from the outer end of the syphon tube 64, and the torque transfer tool 118 is inserted into the syphon tube 64 through its outer end until the hexagonal head 120 is received within the hexagonal recess 98 defined in the sleeve 90. The tool 118 can be used to push the sleeve 90 within the chamber 86 until the end of the sleeve and the end of the tool 118 engage the upper end of the syphon pipe fitting 100. Clockwise rotation of the tool 118 and sleeve 90 causes the alignment projection 124 to engage the syphon pipe fitting threaded bore 108 pivoting the syphon pipe fitting 100 in a clockwise direction, FIG. 7, aligning the threaded bore 108 with the threads 92 of sleeve 90. Continued rotation of the tool 118 causes rotation of the sleeve 90 and threads the threaded stem of the sleeve into the syphon pipe fitting bore 108. Rotation of the tool 118 continues until the head 96 of the sleeve engages the shoulder 88 of the end fitting 84, and at this time, a firm mechanical connection has been made between the syphon tube 64 and the syphon pipe 106. Tightening of the sleeve 90 establishes a fluid tight relationship between the syphon tube and syphon pipe, and draws the surfaces 114 and 116 into tight relationship as shown in FIG. 8.

Thereupon, the tool 118 is withdrawn from the syphon tube 64 and the syphon tube and syphon pipe will be in unrestricted fluid communication with each other. The nut 76 is then threaded into the outer end of the syphon tube 64 to maintain the firm cantilevered support of the syphon tube on the syphon tube support 50.

Figure 2:
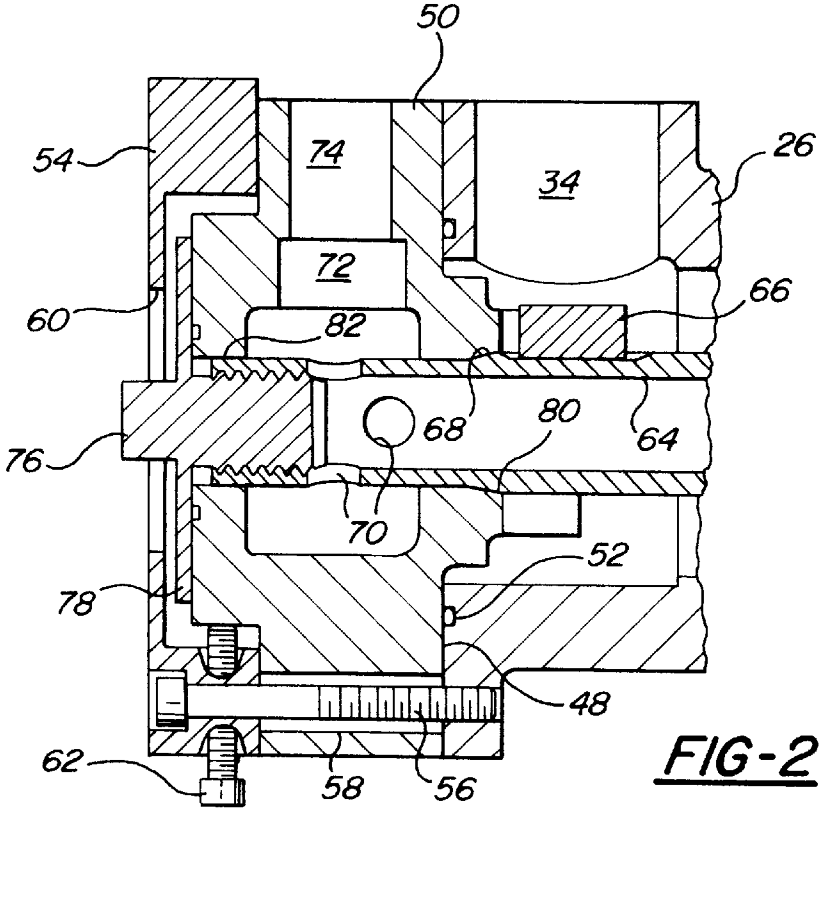
FIG. 2 is an enlarged detail elevational sectional view of the rotary joint of FIG. 1 illustrating the configuration of the syphon tube support in greater detail.

Thereupon, the bolts 56 are somewhat loosened, and the vertical position of the syphon tube support 50 on the rotary joint body 26 is very accurately adjusted by rotation of the cap screw 62 mounted in the retaining ring 54 whose end bears against an axial shoulder defined on the syphon tube support 50 as will be appreciated in FIGS. 1 and 2. This vertical adjustment of the syphon tube support 50 is permitted by the oversized holes 58 through which bolts 56 extend.

The adjustment screw 62 is adjusted to very accurately space the syphon pipe shoe 110 from the inner surface of the drum shell 16 in order to minimize the depth of condensate within the lower portion of the drum. The adjustment screw 62 permits five adjustment of the position of the syphon pipe shoe 110 and inlet 112 relative to the drum after assembly of the components assuring the most accurate positioning of a stationary syphon heretofore attained without scraping the syphon shoe on the drum shell, which would cause excessive wear. Once the syphon structure is properly radially positioned relative to the axis of drum rotation, the bolts 56 are tightened which forces the retaining ring 54 against the syphon tube support 50 which, in turn, frictionally engages the face 48 of the joint body 26 fixing the vertical position of the syphon structure.

From the above description, it will be appreciated that a stationary syphon may be accurately located relative to the drum shell. It will be appreciated that the sequence of assembly steps may vary somewhat from those described above without departing from the novel aspects of the invention. For instance, if the syphon tube end fitting 84 is too large to fit through the bore of the wear plate 42, the syphon tube could be previously inserted through the wear plate prior to it being mounted upon the drum journal, and other sequences of assembly can be varied as within the scope of knowledge of one skilled in the art. Because the key 66 will insure that the syphon pipe 106 is properly oriented to the vertical, the use of the key assures that the syphon system will remove the maximum amount of condensate from the drum, and the firm cantilevered support of the syphon tube assures radial positioning of the entire syphon system. The type of rotary joint described above can be used with a rotary syphon pipe system, and in such event, the structure shown in FIG. 4 is utilized wherein previously described components are indicated by primed reference numerals. When using the rotary joint body with a rotary syphon system, the syphon tube support 126 includes a flat face 128 and seal 130 whereby tightening of the bolts 132 draws the syphon tube support 126 into a firm sealed relationship to the body surface 48'.

The horizontal rotating syphon pipe 133, at its inner end, is in communication with the rotating syphon structure mounted within the drum interior, not shown, and the outer end of the syphon pipe communicates with the port 134 defined in the syphon tube support 126. The syphon tube outer end is supported within a bearing 136 mounted in the syphon tube support, and a smaller diameter tube bearing surface 138 is defined upon the syphon tube. Conventional bearing retaining rings are employed to maintain the bearing 136 within the tube support 126.

From the above, it will be appreciated how the rotary joint body 26 may be utilized, without modification, with a rotary syphon system.

It is appreciated that various modifications to the inventive concepts may be apparent to those skilled in the art without departing from the spirit and scope of the invention.

What is claimed is:

1. A rotary joint for introducing or removing a heat transfer medium relative to a drum having a hollow journal, a shell, and an axis of rotation, comprising, in combination, a stationary support adjacent the drum journal, a hollow rotary joint body mounted upon said support in communication with the drum journal, an inlet port defined in said body, a syphon tube support mounted on said rotary joint body having an outlet port, adjustment means associated with said syphon tube support for vertically adjusting said syphon tube support relative to said rotary joint body, and an elongated syphon tube extending through said rotary joint body and the drum journal in communication with said outlet port mounted upon said syphon tube support whereby vertical adjustment of syphon tube support radially adjusts said syphon tube relative to the drum axis of rotation.

2. In a rotary joint as in claim 1, sealing means interposed between said rotary joint body and said syphon tube support.

3. In a rotary joint as in claim 1, said adjustment means comprising a threaded shaft having a head, said shaft being rotatably mounted and axially fixed relative to said rotary joint body and engaging said syphon tube support.

4. In a rotary joint as in claim 1, said syphon tube support including a conical bore, said syphon tube extending through said bore, a conical boss defined on said syphon tube closely fitting within said conical bore, and a nut threaded onto said syphon tube being against said syphon tube support drawing said boss into said bore.

5. In a rotary joint as in claim 4, a cylindrical bore defined in said syphon tube support spaced from said conical bore, said syphon tube having a cylindrical surface closely received within said cylindrical bore whereby said syphon tube is supported at axially spaced locations.

6. A rotary joint for introducing or removing a heat transfer medium relative to a drum having a hollow journal, a shell, and an axis of rotation, comprising, in combination, a stationary support adjacent the drum journal, a hollow rotary joint body mounted upon said support in communication with the drum journal, an inlet port defined in said body, a syphon tube support mounted on said rotary joint body having an outlet port, an elongated horizontal syphon tube extending through the drum journal, said rotary joint body, said syphon tube support and in communication with said port, said tube having an outer exteriorly accessible end, means supporting said syphon tube upon said syphon tube support, said syphon tube having an inner end located within the drum, a tubular threaded sleeve in communication with and rotatably mounted within said tube inner end having an axis of rotation substantially parallel to the length of said tube and having limited axial movement, torque transfer means defined on said sleeve accessible from said syphon tube outer end, an elongated syphon pipe having an upper end pivoted to said syphon tube inner end and a lower end adapted to be positioned adjacent the drum shell, said syphon pipe being pivotal between an inoperative position generally parallel to the length of said syphon tube to permit insertion through the drum journal and an operative position wherein said syphon pipe is transversely disposed to said syphon tube in communication therewith and said syphon pipe lower end is adjacent the drum shell, and a threaded bore defined in said syphon pipe upper end adapted to receive said threaded sleeve when said syphon pipe is in said operative position whereby a rotatable tool inserted through said syphon tube outer end engages said sleeve torque transfer means to rotate said sleeve to lock said syphon pipe in said operative position.

7. In a rotary joint as in claim 6, a shoulder defined on said syphon tube inner end, and an abutment head defined on said sleeve adapted to engage said shoulder to limit axial movement of said sleeve upon threading of said sleeve into said threaded bore.

8. In a rotary joint as in claim 6, alignment means defined on said rotatable tool, said alignment means engaging said syphon pipe upper end upon rotation of said sleeve to pivot said syphon pipe and align said threaded bore with said threaded sleeve.

9. In a rotary joint as in claim 8, said alignment means comprising an axially extending projection defined on said rotatable tool.

* * * * *